United States Patent [19]

Betlinski et al.

[11] Patent Number: 4,844,217
[45] Date of Patent: Jul. 4, 1989

[54] BRAKE RESERVOIR MAKE-UP SYSTEM

[75] Inventors: Glenn M. Betlinski, Libertyville; Dennis A. Voss, Mt. Prospect, both of Ill.

[73] Assignee: Komatsu Dresser Company, Libertyville, Ill.

[21] Appl. No.: 144,504

[22] Filed: Jan. 15, 1988

Related U.S. Application Data

[63] Continuation-in-part of Ser. No. 900,130, Aug. 25, 1986, abandoned.

[51] Int. Cl.[4] .................. B60K 41/26; B60T 17/06
[52] U.S. Cl. ................................................ 192/4 A
[58] Field of Search .................. 192/4 A, 4 B, 4 C

[56] References Cited

U.S. PATENT DOCUMENTS

| | | | |
|---|---|---|---|
| 2,375,575 | 5/1945 | Campbell | 60/54.6 |
| 2,832,428 | 4/1958 | Kelley et al. | 192/4 A X |
| 2,926,737 | 3/1960 | Fischer | 192/4 A X |
| 3,049,884 | 8/1962 | Schroeder | 60/53 |
| 3,255,642 | 6/1966 | Christenson et al. | 74/645 |
| 3,774,736 | 11/1973 | Ito et al. | 192/4 A |
| 3,802,746 | 4/1974 | Walser | 303/10 |
| 3,978,946 | 9/1976 | Ream | 192/4 A |
| 4,284,182 | 8/1981 | Hakes et al. | 192/4 A |
| 4,307,815 | 12/1981 | Sakazume | 220/85 B |

Primary Examiner—Rodney H. Bonck

[57] ABSTRACT

A brake-transmission system (10) is provided for a vehicle having a transmission system (14) including a transmission (18) and a brake system (12) including brakes (64, 66, 68, 70). The system (10) includes a first fluid reservoir (18, 20) associated with the transmission system (14) for supplying fluid to the transmission system (14). A second fluid reservoir (16) is associated with the brake system (12) for supplying fluid to the brake system (12). Structure (24, 26, 32, 34, 54) is provided for establishing a fluid communication path from the transmission system (14) to the second fluid reservoir (16). Structure (86, 88) is also provided to establish a fluid communication path from the brakes (64, 66, 68, 70) to the first fluid reservoir (18, 20).

6 Claims, 2 Drawing Sheets

BRAKE RESERVOIR MAKE-UP SYSTEM

This application is a continuation-in-part of copending application Ser. No. 900,130 filed on Aug. 25, 1986, now abandoned.

TECHNICAL FIELD

This invention relates to a brake system and, more particularly, to a reservoir tank for use in an integrated transmission and brake system utilizing a common fluid.

BACKGROUND OF THE INVENTION

In hydraulic brake systems for motor vehicles, it is a usual practice to provide a supply of substantially non-compressible brake fluid as well as structure for applying pressure to the brake fluid so as to feed the fluid to the vehicle brakes. Hydraulic circuits are also utilized in the transmission system of vehicles. Pumps are used both in the brake system and transmission system for controlling the flow and pressure of the fluid in the respective systems. There have been efforts to integrate portions of the hydraulic system such as, for example, the power steering and the brake system of a vehicle as shown in U.S. Pat. No. 3,802,746.

It is desirable to integrate the transmission system and brake system of a vehicle. In such a system, transmission fluid can be utilized as a common fluid for both the transmission and brake systems. However, transmission fluid when aerated causes undesirable pump wear. An additional problem in an integrated brake-transmission system is the use of reservoir tanks in the hydraulic system which may contain a large amount of air, particularly when the amount of hydraulic liquid received in the reservoir tank is decreased. Air in the reservoir will be sucked into the hydraulic system, thereby causing cavitation of the pump. Therefore, reservoir tanks in vehicle hydraulic braking systems have used a closed type construction, in which a flexible diaphragm is provided in the reservoir tank above the level of the liquid received in the tank so as to minimize the amount of air contained in the reservoir tank. The diaphragm may be in actual contact with the liquid. It has been required that the diaphragm freely follow the change in the liquid level without generating any negative pressure. One such type of diaphragm is illustrated in U.S. Pat. No. 4,307,815.

A need has thus developed for a reservoir for use in a brake-transmission hydraulic system in which the reservoir can be maintained adequately filled to inhibit the introduction of contaminants and air into the system while still maintaining the required pressure in the brake-transmission system. A need has further arisen for a reservoir which will prevent aerated fluid from entering the brake system pumps, as well as insuring a sufficient amount of fluid for both the brake and transmission systems.

SUMMARY OF THE INVENTION

In accordance with the present invention, a reservoir tank is provided for use in an integrated transmission and brake system which substantially eliminates the problems heretofore associated with such systems.

In accordance with the present invention, in a vehicle having a transmission system and a brake system, a fluid control system is provided. The control system includes structure connected between the brake system and the transmission system for supplying fluid from the transmission system to cool and lubricate the brakes. The system further includes structure connected between the brake system and the transmission system for capturing fluid leaking from the brake apply circuit into the cooling and lubrication circuit and for returning the captured fluid to the transmission system.

In accordance with another aspect of the present invention, a fluid control system is provided for a vehicle having a transmission system and a brake system with brakes associated with the wheels of the vehicle. The control system includes a first fluid reservoir associated with the transmission system for supplying fluid to the transmission system. A second fluid reservoir is provided which is associated with the brake system for supplying fluid to the brake system. Structure is provided for establishing a fluid communication path between the transmission system and the second fluid reservoir. Structure is further provided to establish a fluid communication path from the cooling and lubrication circuit of the brakes of the vehicle to the first fluid reservoir.

In accordance with another aspect of the present invention, a fluid control system is provided for a vehicle having a transmission system and a brake system. A transmission reservoir is associated with the transmission system and is in fluid communication with the transmission system for supplying transmission fluid. A brake reservoir is associated with the brake system and is in fluid communication with the brake system for supplying deaerated transmission fluid to the brake apply circuit of the brake system. A fluid communication path interconnects the transmission system and the brake reservoir, such that the transmission reservoir provides a source of transmission fluid for the brake reservoir. A fluid communication path is established to interconnect the brakes of the vehicle to the transmission reservoir, such that any transmission fluid leaking from the brake apply circuit into the brake cooling and lubrication circuit provides a source of transmission fluid for the transmission reservoir. A further fluid communication path is established between the brake reservoir and the transmission reservoir, such that when the level of transmission fluid in the brake reservoir reaches a predetermined level, transmission fluid flows from the brake reservoir to the transmission reservoir. The fluid communication path between the brake reservoir and transmission reservoir also allows pressure on top of the brake reservoir fluid to equalize with the atmosphere.

BRIEF DESCRIPTION OF THE DRAWING

For a more complete understanding of the present invention and for further advantages thereof, reference is now made to the following Detailed Description taken in conjunction with the accompanying Drawings, in which.

DETAILED DESCRIPTION

Figure 1:
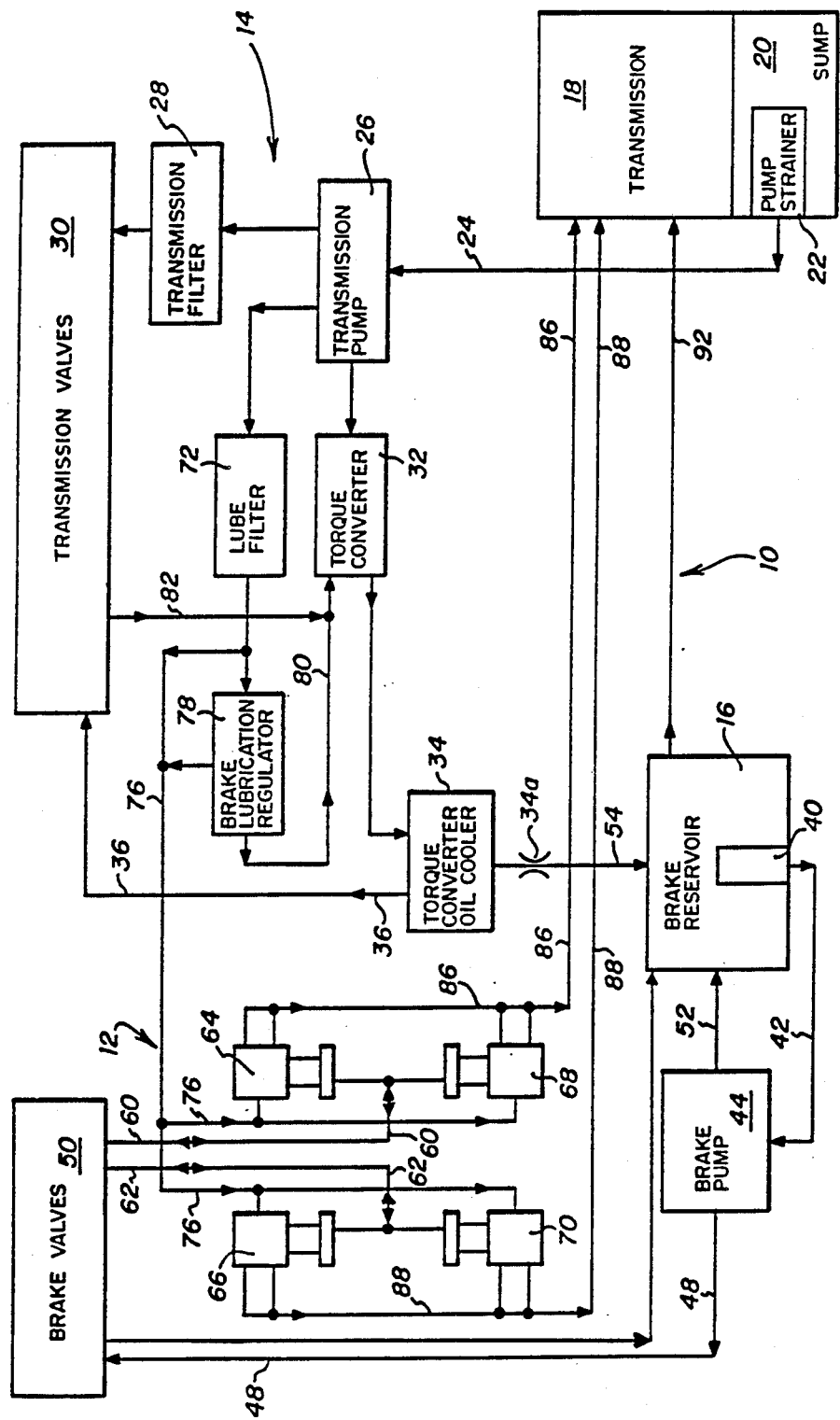
FIG. 1 is a schematic block diagram illustrating the transmission-brake system of the present invention.

Referring to FIG. 1, the present brake-transmission system is illustrated in schematic block diagram form, and is generally identified by the numeral 10. Brake-transmission system 10 includes a brake system generally identified by the numeral 12 and a transmission system generally identified by the numeral 14. An important aspect of the present invention is the use of a brake reservoir 16 disposed between the brake system 12 and transmission system 14. The operation of brake reservoir 16 will be described subsequently.

Transmission system 14 includes the power train or transmission 18 of the vehicle. Associated with transmission 18 is a sump 20 and a pump strainer 22. Transmission 18 and sump 20 provide a fluid reservoir for supplying a substantially non-compressible operating fluid, such as transmission fluid, to transmission system 14. Transmission 18 is connected to transmission sump 20 which, via a line 24, is connected to a transmission pump 26. Transmission pump 26 functions to deliver transmission fluid from transmission sump 20 to transmission system 14. The output of transmission pump 26 is applied to a transmission fluid filter 28 whose output is applied to transmission valves 30. Transmission valves 30 include a range selector valve, a scheduling valve, a neutral disconnect valve, a direction transmission valve, and a main regulator valve all associated with transmission system 14.

Transmission pump 26 further provides a source of transmission fluid to a torque converter 32 whose output is applied to a torque converter oil cooler 34. The output of torque converter oil cooler 34 is also applied to transmission valves 30 via a line 36.

Brake reservoir 16, which includes a strainer 40, supplies fluid via a line 42 to a brake pump 44. Brake pump 44 in turn supplies fluid to brake system 12 of the present brake-transmission system 10. Brake pump 44 supplies fluid via a line 48 to brake valves 50. Brake valves 50 include a master foot brake valve and a pilot foot brake valve typically associated with the brake system of a vehicle. Brake pump 44 also has a drain line 52 for returning fluid from pump 44 to brake reservoir 16.

An important aspect of the present invention is the source of brake fluid for brake reservoir 16. Torque converter oil cooler 34 is connected via a line 54 to the top of brake reservoir 16. The source of fluid for brake reservoir 16 is therefore the same source of fluid as for transmission system 14: the transmission sump 20. Fluid flows from transmission sump 20 via transmission pump 26, torque converter 32, and torque converter oil cooler 34 through flow control orifice 34a via line 54 to brake reservoir 16.

The transmission fluid flowing via line 54 to brake reservoir 16 is aerated and unusable with brake pump 44. However, brake reservoir 16 functions to deaerate the transmission fluid as the transmission fluid enters the top of brake reservoir 16 and exits via line 42 at the bottom of brake reservoir 16 to pump 44. The normal gravitational settling of the transmission fluid within brake reservoir 16 serves to deaerate the transmission fluid as it passes through brake reservoir 16 and strainer 40 between torque converter oil cooler 34 and brake pump 44. It therefore can be seen that the transmission fluid flowing into brake system 12 is free from contaminants and that reservoir 16 provides a sufficient source of deaerated fluid for brake system 12.

The output of brake valves 50 is applied via lines 60 and 62 of the brake apply circuit to the brakes 64, 66, 68 and 70 of the vehicle. An internal source of fluid for cooling and the lubrication of brakes 64, 66, 68 and 70 is provided via transmission pump 26 through a lube filter 72 via a line 76. The output of lube filter 72 is also applied to a brake lubrication regulator 78. The output of brake lubrication regulator 78 is applied to the brakes 64, 66, 68, 60 via line 76. Excess fluid flows to the torque converter 32 via line 80. Transmission valves 30 also provide a fluid input to torque converter 32 via a line 82. It therefore can be seen that fluid flowing within brake system 12 is common to the fluid flowing within transmission system 14.

Any brake fluid leakage from the brake apply circuit to the cooling and lubrication circuit of brakes 64 and 68 is collected via a line 86 which returns to transmission 18. Any brake fluid leaking from the brake apply circuit to the cooling and lubrication circuit of brakes 66 and 70 returns to transmission 18 via a line 88.

Figure 2:
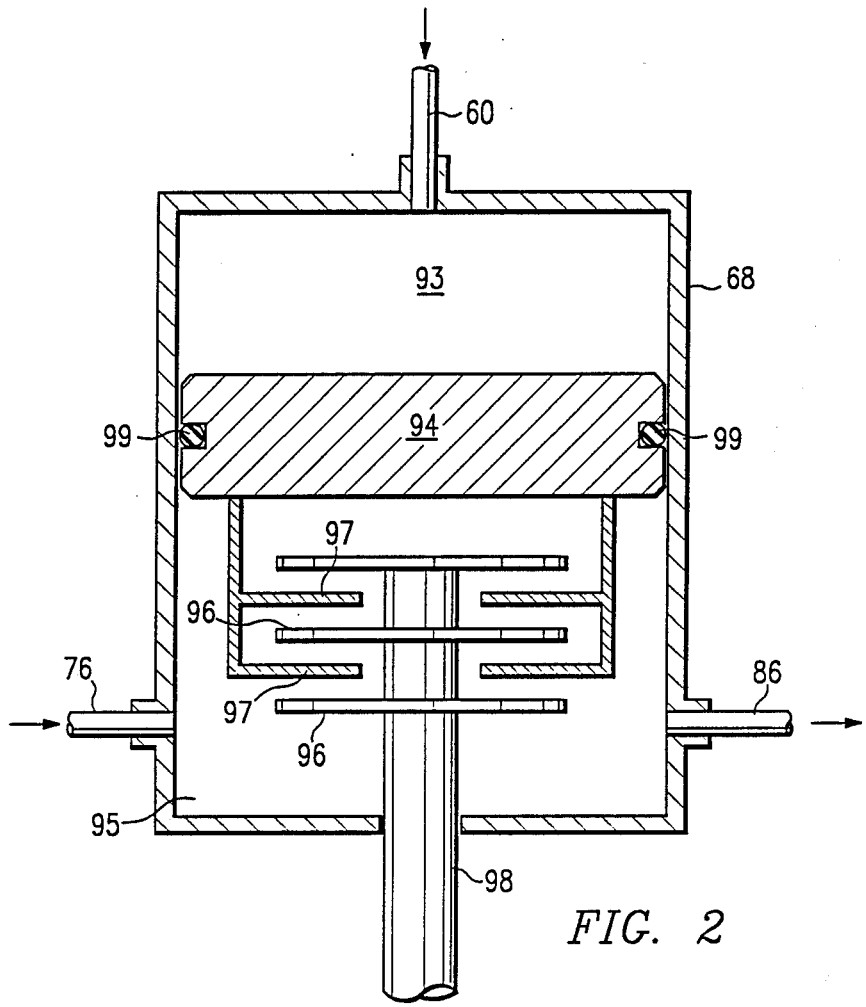
FIG. 2 is a schematic diagram illustrating the operation of one of the brakes of the present invention.

Leakage of fluid from the brake apply circuit is illustrated in the schematic diagram of brake 68 in FIG. 2. Pressurized brake fluid from brake valves 50 enters brake apply cavity 93 of brake 68 via line 60. A piston 94 separates cavity 93 from a brake cooling and lubrication cavity 95 of brake 68. Cooling and lubricating fluid enters cavity 95 through line 76 and exits cavity 95 via line 86. Cooling and lubrication cavity 95 encloses brake discs 96 mounted on vehicle axle 98 for rotation therewith and brake pressure pads 97 connected to piston 94. Brake fluid pressure in cavity 93 actuates piston 94 to apply braking pressure on discs 96 by pads 97. Piston seals 99 provide a fluid seal between brake apply cavity 93 and cooling and lubrication cavity 95.

During the operation of brake 68 (and similar operation of brakes 64, 66, and 70), some pressurized brake fluid in cavity 93 leaks past seals 99. In prior systems having separate fluid systems for brake application and for brake cooling and lubrication, brake fluid leakage past seals 99 caused contamination of the transmission fluid used for cooling and lubrication and caused loss of brake fluid which required periodic replenishment. In the present invention, leakage of fluid past seals 99 is simply captured by the cooling and lubrication circuit and returned via lines 86 and 88 to the transmission 18. Thus, there is no loss of the common fluid during normal operation of brakes 64, 66, 68, and 70 of the present invention.

Referring to again to FIG. 1, an additional line 92 interconnects brake reservoir 16 and transmission 18 to provide an overflow path for brake reservoir 16. When transmission fluid within brake reservoir 16 reaches a predetermined level, any overflow amount flowing into brake reservoir 16 via line 54 and line 52 is supplied to transmission 18 via line 92 which is attached to the top of reservoir 16. Therefore the proper level of fluid within brake reservoir 16 is maintained at all times.

Since brake-transmission system 10 requires only the supplying of transmission fluid, the introduction of contaminants is significantly reduced in the entire brake-transmission system 10. Brake reservoir 16 functions as a supply source for the brake system 12 which supplies deaerated transmission fluid to brakes 64, 66, 68 and 70 via brake pump 44. Brake reservoir 16 is maintained in a full state since it is supplied from transmission system 14. The fluid communication path between brake reservoir 16 and transmission 18 also allows pressure on top of the fluid within brake reservoir 16 to equalize with the atmosphere.

It therefore can be seen that the present invention provides for an integrated brake and transmission system using common transmission fluid. Transmission fluid passes through a brake reservoir for purposes of deaerating the transmission fluid prior to it being supplied to the brakes of the vehicle. The proper level of fluid within the brake reservoir is also maintained as it automatically overflows into the transmission system.

The present invention further provides for the capture of any fluid leakage from the brake apply circuit to the cooling and lubrication circuit. The captured fluid is used to replenish the fluid at the fluid source in the transmission system.

Whereas the present invention has been described with respect to specific embodiments thereof, it is understood that various changes and modifications will be suggested to one skilled in the art and it is intended to encompass such changes and modifications as fall within the scope of the appended claims.

We claim:

1. In a vehicle having a transmission system including a transmission, and a brake system including brakes associated with the wheels of the vehicle, a fluid control system comprising:

a first fluid reservoir associated with the transmission system for supplying fluid to the transmission system;

a second fluid reservoir associated with the brake system for supplying fluid to the brake system;

means for providing a fluid communication path from the transmission system to the second fluid reservoir; and means for providing a fluid communication path from the brakes to the first fluid reservoir.

2. The fluid control system of claim 1 and further including:

means for providing a fluid communication path between said second fluid reservoir and said first fluid reservoir, such that when said fluid within said second fluid reservoir reaches a predetermined level, said fluid flows into said first fluid reservoir.

3. The fluid control system of claim 1 wherein said fluid comprises transmission fluid.

4. The fluid control system of claim 1 wherein fluid flowing in said fluid communication path between the brakes and said first fluid reservoir includes fluid leaking from a brake apply cavity to a brake cooling and lubrication cavity in each of the brakes.

5. The fluid central system of claim 1 and further including:

means for providing a fluid communication path between said second fluid reservoir and said first fluid reservoir for venting said second reservoir.

6. In a vehicle having a transmission system including a transmission, and a brake system including brakes associated with the wheels of the vehicle, a fluid control system comprising:

a transmission fluid reservoir connected to the transmission system and being in fluid communication with the transmission system for supplying transmission fluid to the transmission system;

a brake fluid reservoir connected to the brake system and being in fluid communication with the brake system for supplying deaerated transmission fluid to the brake system;

a fluid communication path interconnecting said transmission fluid reservoir and said brake fluid reservoir, such that said transmission fluid reservoir provides a source of transmission fluid for said brake fluid reservoir;

a fluid communication path interconnecting the brakes to said transmission fluid reservoir, such that transmission fluid from the brakes provides a source of transmission fluid for said transmission fluid reservoir; and a fluid communication path between said brake fluid reservoir and said transmission fluid reservoir, such that when the level of transmission fluid in said brake fluid reservoir reaches a predetermined level, transmission fluid flows from said brake fluid reservoir to said transmission fluid reservoir.

* * * * *